May 13, 1969  R. D. CASTLE  3,443,883
PORTABLE STERILIZER

Filed Oct. 22, 1965  Sheet 1 of 2

INVENTOR.
RICHARD D. CASTLE

BY Thomson & Schoure

ATTORNEYS

May 13, 1969 R. D. CASTLE 3,443,883
PORTABLE STERILIZER
Filed Oct. 22, 1965 Sheet 2 of 2

INVENTOR.
RICHARD D. CASTLE
BY Thomson & Schorer
ATTORNEYS

United States Patent Office 3,443,883
Patented May 13, 1969

3,443,883
PORTABLE STERILIZER
Richard D. Castle, Rochester, N.Y., assignor to Sybron Corporation, a corporation of New York
Filed Oct. 22, 1965, Ser. No. 501,590
Int. Cl. A61l 3/00
U.S. Cl. 21—93                                    15 Claims

ABSTRACT OF THE DISCLOSURE

A portable pressure vessel such as a steam sterilizer which can be heated either by an electrical heater adjacent the vessel or by means of the flame of an open fire and including means for channelling the flame of an open fire onto the sterilizer vessel and a support connected to and spaced a predetermined distance below the vessel and which can be placed in direct contact with the fire.

---

This invention relates to pressure vessels and more specifically to pressurized sterilizer vessels.

One object of my invention is to provide a pressure vessel suitable for use as a steam sterilizer which is adapted for selective, alternative heating by electricity or from the flame of an open fire, thereby making it adaptable for use where there is no ready source of electric power—such as by soldiers in the medical corps during field maneuvers.

It is another object of my invention to provide a sterilizer of the above described nature which when placed above the flames of an open fire may be completely engulfed by the flame without damage to the electrical connections for the sterilizer.

It is an important object of my invention to provide a sterilizer of the above described nature including means for spacing the source of the flame from the bottom of the sterilizer chamber itself.

It is another important object of my invention to provide a sterilizer of the above described nature including means for channeling the flame of the open fire onto the sterilizer vessel including ventilation means directing the flames of the open fire.

Other objects and advantages of this invention will be particularly set forth in the claims and will be apparent from the following description, when taken in connection with the accompanying drawings, in which:

Figure 1:
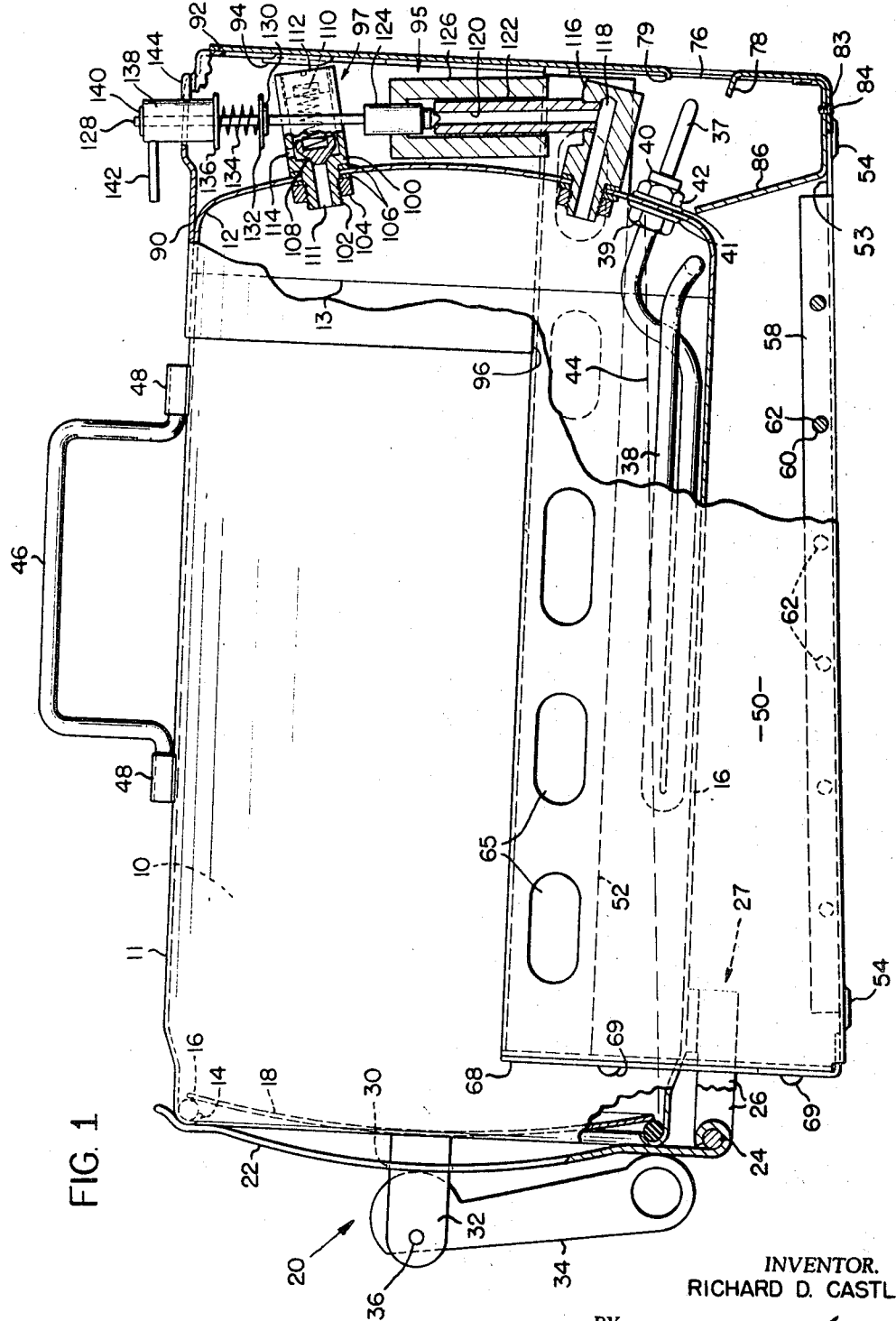
FIG. 1 is a side elevational view with parts broken away and partly in section of one embodiment of my invention.

Basically, the entire construction of my invention is of non-corrosive materials. I provide a pressure chamber 10 of known construction defined generally by a stainless steel cylindrical pressure vessel sidewall 11 and a stainless steel or other suitable non-corrosive back or rear wall closure member 12 rigidly mounted and sealed at 13 to the side-wall 11, as for example by welding. A circular access opening in the front of the sidewall 11 is defined by a semi-annular lip 14 formed from the front edge of the sidewall 11 in which lip there is seated a resilient O-ring seal or gasket 16, thereby providing a seal for a door or closure member 18 preferably of stainless steel. The door 18 is a dished circular disc containing internal warping stresses and is of known construction similar to that shown and described in the A. Vischer, Jr., Patent No. 2,904,212 issued Sept. 15, 1959, entitled, "Pressurized Vessel."

I shall not here describe, in detail, the door construction and function thereof which is adequately described in the above referred to Vischer patent. However, only generally, the door 18 is carried by a door supporting bracket indicated by the arrow and numeral 20 in FIG. 1. Bracket 20 includes a cross-brace 22 pivotally mounted to a shaft 24, in turn mounted between a pair of substantially horizontally extending braces 26 rigidly mounted to a supporting bracket 27, rigidly carried, as for example by welding, on the bottom surface of a cylindrical vessel sidewall 11. The brace 22 is provided with a pair of suitable spaced slots 30 through which extend the legs of a U-shaped yoke 32 to which the door 18 is rigidly mounted. An eccentric cam locking handle 34 is pivotally mounted between the legs of the yoke 32 on a pin 36 supported between the legs of the yoke. In the manner described in the above referred to Vischer patent, the handle 34 is operated to cam the flexible door 18 between sealed and unsealed positions relative to the seal or gasket 16.

It will be understood that for the purposes of this invention any type of a closure arrangement satisfactory for sealing the access opening defined by the lip 14 is contemplated by this invention.

For normal operation of my sterilizer, I provide a heater coil or element 38 terminating in a pair of male terminal elements 37 adapted to receive a female electrical plug.

In a known manner, each of the terminal elements are secured to the rear wall 12 by a combination of an integral flange 39 formed on the terminal, a terminal threaded portion 40 extending beyond the flange 39 which is adapted to extend through an opening in the rear wall 12 and a hex nut 42 threadedly received on threaded portion 40. A pair of insulators 41 are provided on opposite sides of the sidewall 11. In a known manner, when the female electrical plug supplying electrical current to the heating element 38 is plugged into the two male terminals 37, electric current is supplied to the element 38 for converting the water 44, in which the heating element 38 is submerged, into steam for sterilization of the goods supported on a tray or other suitable supporting structure (not shown) such as for example, as shown in the A. Vischer, Jr. Patent No. 2,715,251 issued Aug. 16, 1955.

I provide a handle 46 pivotally mounted to the upper surface of the cylindrical vessel sidewall 11 by a pair of spaced brackets 48 for convenient portable transporting of my pressure vessel sterilizer.

I provide a pair of horizontally spaced side covers or panels 50 each having inwardly disposed upper curved flanges 52 formed by bending the upper end of the cover 50 downwardly to conform to the configuration of the vessel sidewall 11. Flanges 52 are rigidly mounted to the exterior of the sidewalls 11 as for example, by welding. The lower ends of each of the side panels 50 are formed into an inwardly disposed U-shaped in cross-section channel extending the greater length of the side panel 50 comprising a horizontal flange portion 53 and a vertical flange portion 58. It will be seen in FIG. 1 that portions of the vertical flange portions 58 are cut away at each end to accommodate other parts hereinafter described. Pressed or formed in horizontal flange portions 53 are a pair of protruding supports or rests 54 for the sterilizer.

There are a plurality of horizontally spaced bores or openings 60 in each of the vertical flange portions 58 which are coaxially aligned to receive and support a plurality of horizontally spaced bars or rods 62 which are of sufficient length so that they may not be displaced from the holes 60 of the opposing sidecovers 50. The horizontally spaced rods 62 serve to engage a source of fire, as for example, coals 64 of a coke or wood fire, thereby to space the lower surface of the vessel sidewall 11 from the source 64 of the fire or heat when my pressurized sterilizer is used over an open fire.

Figure 2:
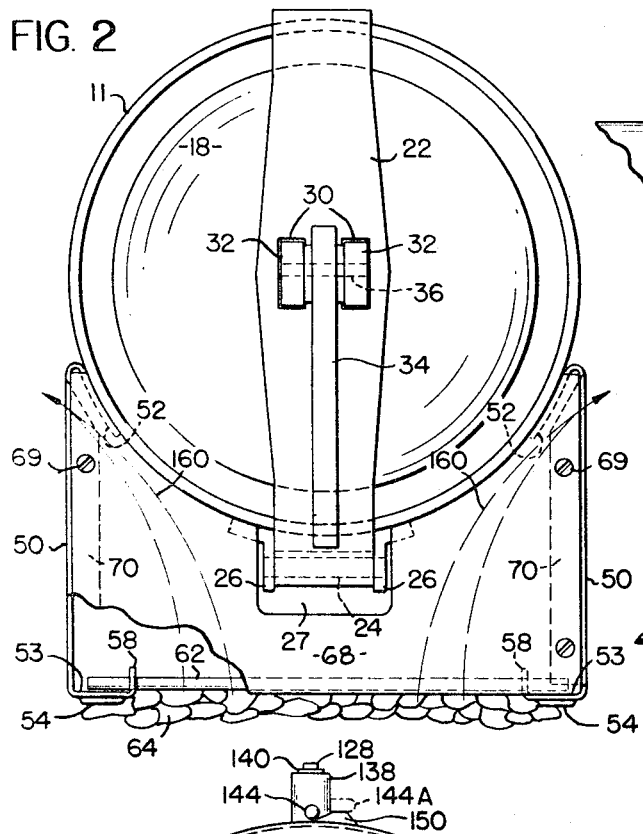
FIG. 2 is a front elevational view of the FIG. 1 embodiment of my invention with parts broken away and partly in section.

I provide a plurality of substantially horizontally spaced elongated openings or vents 65 extending along the upper portion of each of the opposing substantially vertical side panels 50. Vents 65 channel and vent the flame and/or fumes from the source 64 of heat, as indicated by the arrows 160 of FIG. 2. This is a significant aspect of my invention because it facilitates combustion and utilization of the heat of the source 64 to rapidly convert the water 44 into steam when used in the field where electric current is not available at the terminals 37.

I provide a front cover or panel 68 which is rigidly attached, for example by screws 69, to vertical front flanges 70 formed from the left-hand edges as viewed in FIG. 1 of side panels 50. The upper edge of the front panel 68 conforms to the lower cylindrical shape of the vessel sidewall 11 and the side and lower surfaces of bracket supporting member 27. The lower end of front panel 68 is formed into a flange overlying the horizontal flange 53 of the side panel 50.

Each of the opposing side covers 50 have rear vertical flanges 72 (FIG. 3) formed from the right-hand edges as viewed in FIG. 1 of side panels 50. I provide a terminal shield 86 to protect the electrical terminals from the direct heat of the source 64. Shield 86 horizontally overlies and is rigidly mounted (as for example by spot welding) to the horizontal lower flange portions 53 of the side covers 50 where the vertical flange 58 is cut away at the right-hand side as viewed in FIG. 1.

Figure 3:
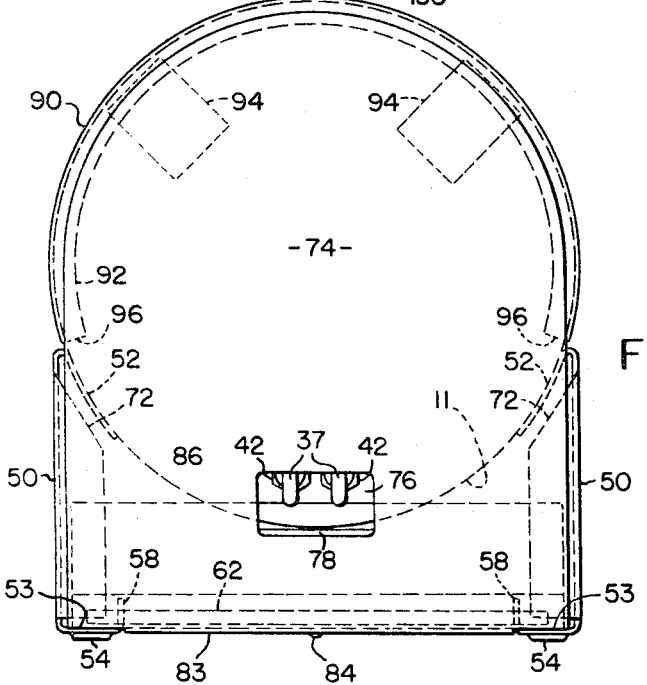
FIG. 3 is a back elevational view of the FIG. 1 embodiment of my invention.

I provide an upper rear housing 90 having a generally semi-cylindrical configuration overlying and spot welded to the right-hand or rear end of the vessel sidewall 11 as viewed in FIG. 1. Upper rear housing 90 has a small rear vertical lip or flange 92 for a purpose hereinafter described. Upper housing 90 terminates at a lower edge 96 (FIG. 1) in substantially abutting relationship with the upper edge of the side covers 50 as illustrated in FIG. 3.

A back cover or panel 74 has a cut away portion 76 defining a rectangular opening suitable for receiving a plug (not shown) for terminals 37. Parts of the cut away portion 76 are formed into internally disposed flanges 78 and 79 seen in FIG. 1. Back cover 74 is mounted exteriorly of the rear flanges 72 of the side panels 50. A pair of tabs 94, rigidly secured to the back surface of the back cover 74 (as for example by spot welding) are adapted to receive the small rear vertical lip 92 of upper rear housing 90 for locking the back cover 74 against upward movement or outward displacement from the position illustrated in the drawings. There is an internally disposed horizontal flange 83 formed at the lower end of back cover 74 adapted to underlie the horizontal portion of terminal shield 86 to which it is secured by a screw 84. The left and right-hand corner (as viewed in FIG. 3) of the lower horizontal flange 83 of back cover 74 are cut away thereby to permit flange 83 to be received between the horizontal flange portions 53 of side panels 50.

It will be understood that the combination of side panels 50, the front cover 68, and the terminal shield 86 provide a hood which channels the flames and heat from the source 64 onto the bottom surface of the vessel sidewall 11 and out through the vents 65 thereby to convert the water 44 internally of the vessel 10 into steam for sterilizing.

Valve assembly

My construction includes an exhaust valve assembly 95 and a safety release valve assembly 97. Safety release valve assembly 97 includes a safety valve body 100 having a threaded neck 102 extending through an opening in the rear wall closure member 12 as seen in FIG. 1. Threaded neck 102 reecives a nut 104 which compresses a pair of gaskets 106 on opposite sides of the rear wall closure member 12 thus rigidly securing the valve body 100 to the pressure vessel. I provide a needle valve 108 internally of the valve body 100 biased by a compression spring 110 toward closure with a valve opening 111 extending through the valve neck 102. The tension on the spring 110 is adjustable by a threaded screw member 112 received in the right-hand end of the safety valve body 100. If steam pressure exceeds the value for which the spring 110 is set, steam passes through throat 111 to a valve outlet 114.

The exhaust valve assembly 95 includes a plug 116 rigidly mounted to the rear wall closure member 12 in the same manner above described with regard to the safety valve assembly 97. The plug has a central bore 118 communicating with a central bore 120 of a conduit 122 rigidly mounted to the plug 116 as for example by a threaded connection.

The upper end of the bore 120 receives a valve 124 which is oriented in that position by an integral external collar 126 having an inside diameter adapted to receive the outside diameter of the conduit 122. The upper end of the needle valve carries a rod 128 having an integral flange 130 on which rests a washer 132, a compression spring 134 and a second washer 136.

There is a collar 138 slidably mounted on the rod 128 which is limited in its upward movement by a pin 140 extending transversely through the upper end of the rod 128. Collar 138 is provided with laterally extending integral handle 142 and an integral pointer 144.

Figure 4:
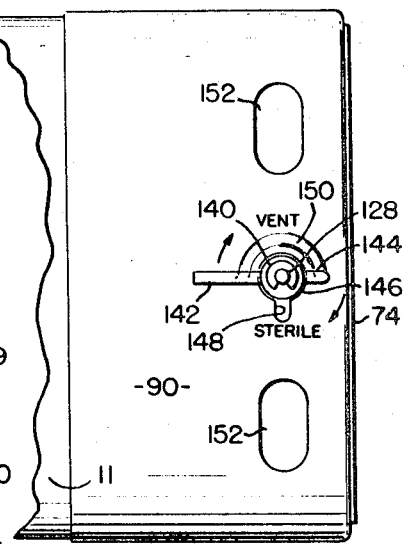
FIG. 4 is a partial top elevational view of only the right hand end of the FIG. 1 embodiment of my invention.

With reference to FIG. 4, the collar 138 extends through a circular opening 146 in the upper surface of the upper housing 90. There is a slot 148 in the upper housing communicating with the circular opening 146 which is adapted to receive the pointer 144 when turned 90° in a clockwise direction from the position illustrated in FIG. 4 as indicated by the arrow. Pointer 144 is axially spaced from the handle 142 along the collar 138 (FIG. 1) in a direction closer to the valve 124, so that when the pointer 144 is in the latter described position in coaxial alignment with the slot 148 and the operator depresses the handle 142 axially in opposition to the compression spring 134, the pointer 144 is received through slot 148 at a "sterilize" position. Thereafter, the handle 142 is turned an additional 90° in either direction for locking the pointer 144 below the internal surface of rear housing 90. Downward pressure applied to spring 134 is imparted to rod 128 to the valve 124 thereby seating the needle valve securely in the opening 120 of the conduit 122 against internal steam pressure of the chamber 10. Thus, in this locked position the vessel is ready for pressurization by conversion of the water 44 into steam. There is a cam surface 150 in the upper rear housing 90 adapted for camming the pointer 144 upwardly when turned 90° in a counter-clockwise direction from the FIG. 4 position to the broken line "vent" position illustrated at 144A in FIG. 3, thereby a elevate collar 138 and in turn rod 128 and valve 124 to completely unseat the needle valve from the conduit 122, thus permitting unrestricted venting or exhausting of the chamber between the outside surface of conduit 122 and the inside surface of collar 126 and out through vent openings 152 in the upper rear housing.

Operation

Whether in a location suitable for electrical operation or in the field over an open fire, the operator will normally have the pointer 144 in the "vent" position permitting steam to build up in the chamber 10 thereby to initially exhaust all the air from the chamber. When the chamber has been exhausted of air, the operator moves the handle 142 in a clockwise direction until the pointer 144 is in the "sterilize" position coaxial with the slot 148 and thereafter depresses the handle 142 to fix the valve 124 in the "sterilize" position securely seated in the conduit 122 as above described preventing discharge of further steam. After completion of the selected sterilizing period, the operator turns the handle 142 until the pointer 144 is coaxial with the slot 148, moves the collar 138, and in turn valve 124 axially upward to release exhaust from the chamber through upper vents 152.

It will be understood that my invention is adaptable for any type of pressurized vessel to be heated, but is particularly suitable for a pressurized sterilizing vessel.

While there has been shown and described the preferred form a mechanism of my invention, it will be apparent that various modifications and changes may be made therein, particularly in the form and relation of parts, without departing from the spirit of this invention as set forth in the appended claims.

I claim:

1. A portable field sterilizer comprising a pressure vessel, a handle connected to said vessel, said vessel having a size and weight such that it can be carried by means of said handle by one hand of a person; enclosure means for channeling the flame of an open fire having a source external to and separate from said sterilizer onto said vessel for heating said vessel; and electric heater means adjacent said vessel and protected from said flame for heating said vessel.

2. In combination with a portable pressure vessel, a handle connected to said vessel, said vessel having a size and weight such that it can be carried by means of said handle by one hand of a person, enclosure means for channeling the flame of an open fire having a source external to and separate from said pressure vessel onto said vessel for heating said vessel; and electric heater means inside said vessel and protected from said flame for heating said vessel.

3. In combination with a pressure vessel assembly including a pressure vessel, enclosure means for channeling the flame of an open fire having a source external to and separate from said pressure vessel assembly onto said vessel for heating said vessel including ventilation openings at substantially the top thereof; support means connected to said pressure vessel and positioned a predetermined distance below said pressure vessel and adapted to be placed in direct contact with said open fire to support said vessel said predetermined distance above said fire, said support means having a plurality of openings therethrough to allow said flame to pass through said support means and electric heater means adjacent said vessel and protected from said flame for heating said vessel.

4. In combination with a portable pressure vessel assembly including a pressure vessel, enclosure means for channeling the flame of an open fire having a source external to and separate from said portable pressure vessel assembly onto said vessel and adapted to be placed in direct contact with said source for supporting and for heating said vessel including ventilation openings at substantially the top thereof; support means connected to said pressure vessel assembly and spaced a predetermined distance below said pressure vessel adapted for engaging a source of said flame for supporting and spacing said vessel from the source of said flame; and electric heater means adjacent said vessel and protected from said flame for heating said vessel.

5. In combination with a pressure vessel assembly including a pressure vessel, enclosure means for channeling the flame of an open fire onto said vessel for heating said vessel; support means connected to said pressure vessel and spaced a predetermined distance below said vessel and adapted to be placed in direct contact with said open fire for supporting and spacing said vessel from the source of said flame; said support means including a plurality of openings extending therethrough to allow said flame to pass through said support means toward said pressure vessel and electric heater means inside said vessel and protected from said flame for heating said vessel.

6. In combination with a pressure vessel apparatus including a pressure vessel, enclosure means for channeling the flame of an open fire having a source external to and separate from said pressure vessel apparatus onto said vessel for heating said vessel; a plurality of rods connected to said enclosure means and positioned a predetermined distance below said pressure vessel and adapted for engaging a source of said flame for spacing said vessel said predetermined distance from the source of said flame; and electric heater means adjacent said vessel and protected from said flame for heating said vessel.

7. In combination with a pressure vessel assembly including a pressure vessel, support means connected to said pressure vessel and positioned a predetermined distance below said pressure vessel for spacing said vessel said predetermined distance from a source of the flame of an open fire, said source being external to and separate from said pressure vessel assembly, electric heater means adjacent said vessel and protected from said flame for heating said vessel and having a terminal; and means enclosing and protecting said terminal from said flame for receiving an electrical connection adapted for connection with said terminal.

8. In combination with a pressure vessel assembly including a pressure vessel, a handle connected to said pressure vessel, said pressure vessel assembly having a size and weight such that it can be carried by hand, support means connected to said pressure vessel for spacing said vessel from a source of the flame of an open fire, said source being external to and separate from said pressure vessel assembly; electric heater means inside said vessel and protected from said flame for heating said vessel and having a terminal; and means enclosing and protecting said terminal from said flame for receiving an electrical connection adapted for connection with said terminal.

9. In combination with a portable pressure vessel assembly including a pressure vessel, a handle connected to said pressure vessel, said pressure vessel having a size and weight such that it can be carried by hand, support means connected to said pressure vessel and spaced a predetermined distance below said pressure vessel for spacing said vessel said predetermined distance from a source of the flame of an open fire, said source being external to and separate from said pressure vessel assembly; electric heater means adjacent said vessel for heating said vessel and having a terminal at an end opposite a closure member of said vessel; and means enclosing and protecting said terminal from said flame for receiving an electrical connection adapted for connection with said terminal.

10. In combination with a pressure vessel assembly including a pressure vessel, enclosure means for channeling the flame of an open fire having a source external to and separate from said pressure vessel assembly onto said vessel for heating said vessel; support means connected to said pressure vessel and spaced a predetermined distance below said pressure vessel for spacing said vessel from said source; electric heater means adjacent said vessel and protected from said flame for heating said vessel and having a terminal; and means enclosing and protecting said terminal from said flame for receiving an electrical connection adapted for connection with said terminal.

11. In combination with a pressure vessel, enclosure means for channeling the flame of an open fire having a source external to and separate from said pressure vessel onto said vessel for heating said vessel; support means connected to said pressure vessel and spaced a predetermined distance below said pressure vessel for supporting and for spacing said vessel from said source; electric heater means inside said vessel and protected from said flame for heating said vessel and having a terminal outside said vessel; and means enclosing and protecting said terminal from said flame for receiving an electrical connection adapted for connection with said terminal.

12. A portable field sterilizer comprising a pressure vessel, a handle connected to said pressure vessel, said pressure vessel having a size and weight such that it can be carried by hand, enclosure means for channeling the flame of an open fire having a source external to and separate from said field sterilizer onto said vessel for heating said vessel, said enclosure means including ventilation openings at substantially the top thereof; support means connected to said pressure vessel and spaced a predetermined distance below said pressure vessel for supporting and for spacing said vessel from said source; electric heater means inside said vessel and protected from said flame for heating said vessel and having a terminal outside said vessel; and means enclosing and protecting said terminal from said flame for receiving an electrical connection adapted for connection with said terminal.

13. A portable field sterilizer comprising a pressure vessel, a handle connected to said pressure vessel, said vessel being of a size and weight such that it can be carried by hand, enclosure means for channeling the flame of an open fire onto said vessel for heating said vessel including ventilation openings at substantially the top thereof; a plurality of rods connected to said enclosure means and adapted for engaging a source of said flame for spacing said vessel from a source of the flame of an open fire said source being external to and separate from said sterilizer; electric heater means inside said vessel and protected from said flame for heating said vessel and having a terminal outside said vessel; and means enclosing and protecting said terminal from said flame for receiving an electrical connection adapted for connection with said terminal.

14. A portable field sterilizer comprising a pressure vessel, enclosure means for channeling the flame of an open fire onto said vessel for heating said vessel, including ventilation openings at substantially the top thereof; support means connected to said vessel and spaced a predetermined distance below said vessel and adapted to directly engage a source of said flame, said source being external to and separate from said sterilizer, for spacing said vessel from said source; electric heater means inside said vessel and protected from said flame for heating said vessel and having a terminal outside said vessel and at an end opposite a closure member of said vessel; and means enclosing and protecting said terminal from said flame for receiving an electrical connection adapted for connection with said terminal.

15. A portable field sterilizer comprising a pressure vessel, a support connected to said vessel and positioned below said vessel for directly contacting an open fire, having a source external to and separate from said sterilizer, said support having a plurality of openings therethrough for the flame of said fire, enclosure means for channeling the flame of said fire onto said vessel for heating said vessel; electric heater means adjacent said vessel and protected from said flame for heating said vessel and having a terminal; and means enclosing and protecting said terminal from said flame for receiving an electrical connection adapted for connection with said terminal.

References Cited

UNITED STATES PATENTS

| | | | |
|---|---|---|---|
| 571,541 | 11/1896 | Sprague | 21—98 |
| 583,514 | 6/1897 | Sprague | 21—98 |
| 2,526,974 | 10/1950 | Schpanski | 21—98 |
| 2,548,691 | 4/1951 | Vischer | 21—98 |
| 3,298,776 | 1/1967 | Beecher | 21—98 |

MORRIS O. WOLK, *Primary Examiner.*

B. S. RICHMAN, *Assistant Examiner.*

U.S. Cl. X.R.

21—91, 94, 98, 103